United States Patent
Tai et al.

(10) Patent No.: US 8,050,061 B2
(45) Date of Patent: Nov. 1, 2011

(54) CONTROL CIRCUIT FOR SWITCHING POWER SUPPLY

(75) Inventors: Fang-Ta Tai, Taipei Hsien (TW);
Chen-Hsiang Lin, Taipei Hsien (TW);
Teng-Feng Zou, Taipei Hsien (TW);
Jui-Ting Hung, Taipei Hsien (TW);
Yi-Bin Hwang, Taipei Hsien (TW);
Li-Chung Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 322 days.

(21) Appl. No.: 12/417,620

(22) Filed: Apr. 2, 2009

(65) Prior Publication Data

US 2010/0220506 A1    Sep. 2, 2010

(30) Foreign Application Priority Data

Mar. 2, 2009    (CN) .......................... 2009 1 0300643

(51) Int. Cl.
*H02M 1/12* (2006.01)
*H02J 1/10* (2006.01)
(52) U.S. Cl. ........................................... 363/40; 307/29
(58) Field of Classification Search .................... 363/40, 363/49, 55, 95, 131; 323/901; 307/29, 66
See application file for complete search history.

(56) References Cited

U.S. PATENT DOCUMENTS

| | | | | |
|---|---|---|---|---|
| 5,549,469 A * | 8/1996 | Wild et al. | ...................... | 431/75 |
| 5,784,268 A * | 7/1998 | Steffek et al. | ................... | 363/55 |
| 5,993,039 A * | 11/1999 | Crill | .............................. | 700/79 |
| 6,075,224 A * | 6/2000 | De Coster | .................. | 219/130.4 |
| 6,661,123 B2 * | 12/2003 | Hsu | ............................... | 307/141 |
| 7,355,302 B2 * | 4/2008 | Stonestreet et al. | ............ | 307/29 |
| 7,602,081 B2 * | 10/2009 | Stonestreet et al. | ............ | 307/29 |
| 2003/0030392 A1 * | 2/2003 | Neranjan et al. | ................ | 318/34 |

* cited by examiner

*Primary Examiner* — Adolf Berhane
(74) *Attorney, Agent, or Firm* — Altis Law Group, Inc.

(57) ABSTRACT

A control circuit for a switching power supply (SPS) includes power input and output interfaces, a relay, a relay driving circuit, a microprocessor, and an alternating current/directing current (AC/DC) converter. The power input interface receives an external alternating current (AC) power signal, and transmits the AC power signal to the SPS via the power output interface. The AC/DC converter transforms the AC power signal into a direct current (DC) power signal to supply for the relay, the relay driving circuit, and the microprocessor. When a computer is turned on, the microprocessor sends a first control signal to control the relay driving circuit to drive the relay to connect the power input and output interfaces. When the computer is turned off, the microprocessor sends a second control signal to control the relay driving circuit to drive the relay to cut off connection between the power input and output interfaces.

8 Claims, 2 Drawing Sheets

CONTROL CIRCUIT FOR SWITCHING POWER SUPPLY

BACKGROUND

1. Technical Field

The present disclosure relates to control circuits for switching power supplies (SPSs), and particularly to a control circuit for a SPS of an electronic device.

2. Description of the Related Art

Nowadays, SPSs are widely used in electronic devices, such as computers. When a computer is turned off, a SPS in the computer still outputs a standby voltage to a motherboard of the computer in order to quickly turn on the computer at another time. However, if the computer is not used for a long time, the standby voltage may cause power waste.

DETAILED DESCRIPTION

Figure 1:
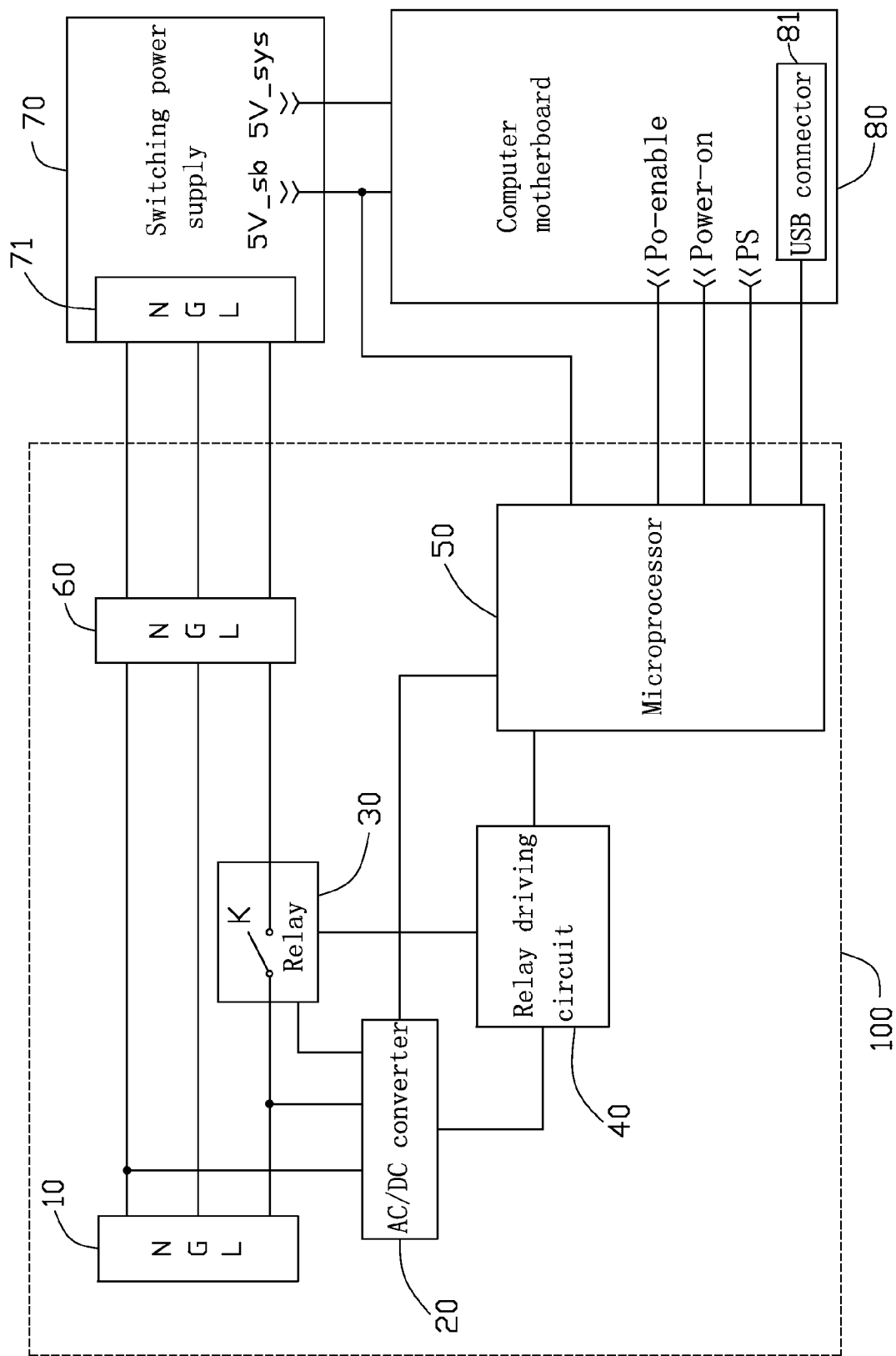
FIG. 1 is a block diagram of an exemplary control circuit for a SPS connected to a computer motherboard.

Referring to FIG. 1, an exemplary control circuit 100 for a switching power supply (SPS) 70 includes a power input interface 10, an alternating current to direct current (AC/DC) converter 20, a relay 30, a relay driving circuit 40, a microprocessor 50, and a power output interface 60. The control circuit 100 can be used to save energy for a computer motherboard 80.

The power input interface 10 is configured to be connected to an external power source, to receive an external alternating current (AC) power signal, such as a 220V AC power signal. The power input interface 10 is connected to the power output interface 60 via a neutral line N, a ground line G, and a hot line L. The power output interface 60 is configured to supply the external AC power signal to the SPS 70 via a power interface 71 of the SPS 70. The SPS 70 includes a power conversion circuit (not shown), to convert the AC power signal from the external power source into a direct current (DC) power signal. The DC power signal may include a 5V system power signal and a 5V standby power signal, in one example. The SPS 70 supplies the DC power signal to the computer motherboard 80 of a computer. The AC/DC converter 20 receives the AC power signal, and converts the AC power signal into a DC power signal to supply to the relay 30, the relay driving circuit 40, and the microprocessor 50. The relay 30 includes a switch K connected to the hot line L between the power input interface 10 and the power output interface 60. The microprocessor 50 is connected to a 5V-standby-power pin 5V_sb of the SPS 70, a power-enable pin Po-enable, a power-on pin Power-on, a power-supply-on pin PS, and a USB connector 81 of the computer motherboard 80.

When the computer is turned on, the microprocessor 50 receives a power-on signal from the power-on pin Power-on of the computer motherboard 80, and then outputs a first control signal to the relay driving circuit 40. The relay driving circuit 40 drives the relay 30 to turn on the switch K. The external power source supplies the external AC power signal to the SPS 70 via the power input interface 10 and the power output interface 60. Accordingly, the SPS 70 outputs a 5V system voltage and a 5V standby voltage to the computer motherboard 80 via a 5V-system-power pin 5V_sys and the 5V-system-power pin 5V_sb of the SPS 70, respectively. The SPS 70 further outputs the 5V standby voltage to the microprocessor 50. After receiving the 5V system voltage and the 5V standby voltage, the computer motherboard 80 outputs a feedback signal to the microprocessor 50 via the power-supply-on pin PS to indicate that the SPS 70 has supplied power. The microprocessor 50 outputs an enable signal to the computer motherboard 80 via the power-enable pin Po-enable to turn on the computer motherboard 80.

When the computer is turned off, the microprocessor 50 receives a power-off signal from the USB connector 81, and outputs a second control signal to the relay driving circuit 40. The relay driving circuit 40 drives the relay 30 to turn off the switch K. As a result, the external power source cannot supply the external AC power signal to the SPS 70 via the power input interface 10 and the power output interface 60. Thus, the SPS 70 cannot supply a 5V standby voltage to the computer motherboard 80, and the computer motherboard 80 has no power consumption.

Figure 2:
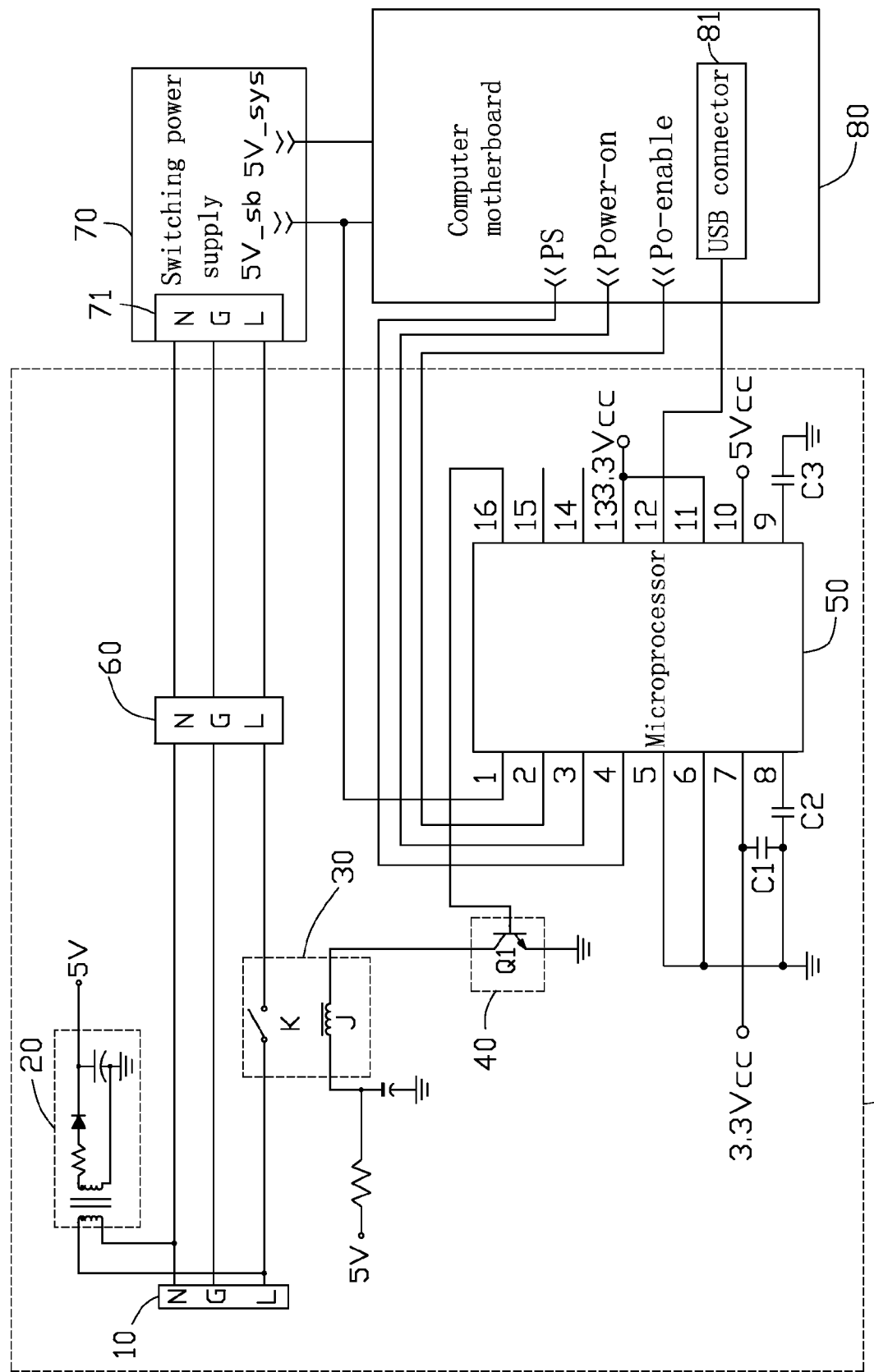
FIG. 2 is a circuit diagram of an exemplary of the control circuit of FIG. 1.

Referring to FIG. 2, the relay driving circuit 40 includes a transistor Q. The relay driving circuit 40 can be other switch circuits depending on the embodiments. The relay 30 further includes a coil J. A first terminal of the coil J of the relay 30 is connected to a 5V power terminal of the AC/DC converter 20 to receive a 5V voltage, and is grounded through a capacitor (not labeled). A second terminal of the coil J is connected to a collector of the transistor Q1. An emitter of the transistor Q1 is grounded. A base of the transistor Q1 is connected to a sixteenth pin of the microprocessor 50, which is an EM78612A type chip in one embodiment. The microprocessor 5 can be replaced by other types of chip depending on the disclosure. A first pin of the microprocessor 50 is connected to the 5V-standby-power pin 5V_sb of the SPS 70; a second pin is connected to the power-enable pin Po-enable of the computer motherboard 80; a third pin and a fourth pin are connected to a power-on pin Power-on and a power-supply-on pin PS respectively; a fifth pin and a sixth pin are grounded; a seventh pin is connected to a 3.3V power supply 3.3 Vcc, and is grounded through a capacitor C1; an eighth pin is grounded through a capacitor C2, and a ninth pin is grounded through a capacitor C3; a tenth pin is connected to a 5V power supply 5 Vcc, an eleventh pin and a thirteenth pin are connected to a 3.3V power supply 3.3 Vcc, and a twelfth pin is connected to the USB connector 81 of the computer motherboard 80.

When the computer is turned on, the microprocessor 50 outputs the first control signal, which is a high level signal, such as 5V in one embodiment, to the base of the transistor Q1 through the sixteenth pin to turn on the transistor Q1. A current flowing through the transistor Q1 and the coil J turns on the switch K. The external power source supplies the external AC power signal to the SPS 70 via the power input interface 10 and the power output interface 60. The microprocessor 50 outputs the enable signal to turn on the computer motherboard 80.

When the computer is turned off, the microprocessor 50 receives the power-off signal from the USB connector 81 and outputs the second control signal, which is a low level signal, such as 0.1V in one embodiment, to the base of the transistor Q1 through the sixteenth pin. The transistor Q1 is turned off to turn off the switch K. As a result, the external power source cannot supply the external AC power signal to the SPS 70 via the power input interface 10 and the power output interface 60. Thus, the computer motherboard 80 has no power consumption.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A control circuit for a switching power supply (SPS), the control circuit comprising:
   a power input interface to receive an external alternating current (AC) power signal;
   a power output interface to output the AC power signal from the power input interface;
   a relay comprising a relay switch, the relay switch connected between the power input interface and the power output interface;
   a relay driving circuit to drive the relay switch to be turned on or turned off;
   a microprocessor to control the relay driving circuit and connected to a computer motherboard; and
   an alternating current/directing current (AC/DC) converter to receive the AC power signal from the power input interface, and transform the AC power signal into a direct current (DC) power signal to supply power to the relay, the relay driving circuit, and the microprocessor;
   wherein the microprocessor sends a first control signal to control the relay driving circuit to turn on the relay switch to connect the power input interface to the power output interface in response to the microprocessor receiving a power-on signal from the computer motherboard; and
   wherein the microprocessor sends a second control signal to control the relay driving circuit to turn off the relay switch to cut off connection between the power input interface and the power output interface in response to the microprocessor receiving a power-off signal from the computer motherboard.

2. The control circuit of claim 1, wherein the relay driving circuit comprises a transistor, wherein an emitter of the transistor is grounded, and a base of the transistor is connected to the microprocessor to receive the first or second control signal.

3. The control circuit of claim 2, wherein the relay switch is connected to a hot line between the power input interface and the power output interface, and wherein the relay comprises a relay coil connected between the AC/DC converter and a collector of the transistor.

4. A circuit comprising:
   a power input interface to receive an external alternating current (AC) power;
   a power output interface to output the AC power signal from the power input interface;
   a computer motherboard;
   a switching power supply (SPS) connected to the power output interface to receive the AC power signal, and connected to the computer motherboard to supply power for the computer motherboard;
   a relay comprising a relay switch, the relay switch connected between the power input interface and the power output interface;
   a relay driving circuit to drive the relay switch to be turned on or turned off;
   a microprocessor to control the relay driving circuit and connected to the computer motherboard; and
   an alternating current/directing current (AC/DC) converter to receive the AC power signal from the power input interface, and to transform the AC power signal to a direct current (DC) power signal to supply for the relay, the relay driving circuit, and the trigger;
   wherein the microprocessor controls the relay driving circuit to turn on the relay switch to connect the power input interface to the power output interface in response to the microprocessor receiving a power-on signal from the computer motherboard; and
   wherein the microprocessor controls the relay driving circuit to turn off the relay switch to cut off connection between the power input interface and the power output interface in response to the microprocessor receiving a power-off signal from the computer motherboard.

5. The circuit of claim 4, wherein the relay driving circuit comprises a transistor; an emitter of the transistor is grounded; and a base of the transistor is connected to the microprocessor.

6. The circuit of claim 5, wherein the relay switch is connected to a hot line between the power input interface and the power output interface; the relay further comprises a relay coil connected between the AC/DC converter and a collector of the transistor.

7. The circuit of claim 6, wherein the microprocessor is connected to a power-on pin and a USB connector of the computer motherboard, wherein the power-on signal of the computer motherboard is transmitted to the microprocessor through the power-on pin, and the power-off signal of the computer motherboard is transmitted to the microprocessor through the USB connector.

8. The circuit of claim 7, wherein the microprocessor is further connected to a power-supply-on pin and a power-enable pin of the computer motherboard, and a 5V-standby-power pin of the SPS.

* * * * *